United States Patent
Kao

(10) Patent No.: US 8,867,672 B2
(45) Date of Patent: *Oct. 21, 2014

(54) SYSTEM AND A METHOD OF REGULATING A SLICER FOR A COMMUNICATION RECEIVER

(71) Applicant: Himax Media Solutions, Inc., Tainan (TW)

(72) Inventor: Shiang-Lun Kao, Tainan County (TW)

(73) Assignee: Himax Media Solutions, Inc., Tainan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/911,413

(22) Filed: Jun. 6, 2013

(65) Prior Publication Data

US 2013/0266091 A1    Oct. 10, 2013

Related U.S. Application Data

(62) Division of application No. 12/894,745, filed on Sep. 30, 2010, now Pat. No. 8,514,923.

(51) Int. Cl.
    H04L 27/06    (2006.01)
    H04L 1/00     (2006.01)
    H04L 25/06    (2006.01)

(52) U.S. Cl.
    CPC ........... H04L 1/0091 (2013.01); H04L 25/062 (2013.01)
    USPC ............................ 375/340; 375/354; 713/500

(58) Field of Classification Search
    None
    See application file for complete search history.

(56) References Cited

U.S. PATENT DOCUMENTS 6,389,548 B1 *    5/2002    Bowles ................. 713/500
2002/0181633 A1 * 12/2002    Trans .................... 375/354

* cited by examiner

*Primary Examiner* — Adolf DSouza
(74) *Attorney, Agent, or Firm* — Donald E. Stout; Stout, Uxa & Buyan, LLP

(57) ABSTRACT

The invention is directed to a system and method of regulating a slicer for a communication receiver. A zero-crossing accumulator receives a slicer output from the slicer and accordingly determines a zero-crossing length of the slicer output. A threshold decision unit regulates at least one threshold value of the slicer according to the zero-crossing length.

12 Claims, 4 Drawing Sheets

SYSTEM AND A METHOD OF REGULATING A SLICER FOR A COMMUNICATION RECEIVER

CROSS-REFERENCE TO RELATED APPLICATIONS

This application is a divisional of U.S. application Ser. No. 12/894,745, filed on Sep. 30, 2010 and entitled SYSTEM AND A METHOD OF REGULATING A SLICER FOR A COMMUNICATION RECEIVER, the entire contents of which are hereby incorporated by reference.

BACKGROUND OF THE INVENTION

1. Field of the Invention

The present invention generally relates to a communication network, and more particularly to a system and method of adaptively regulating a slicer for an Ethernet receiver.

2. Description of Related Art

Ethernet is a computer networking technique that is widely used in constructing a local area network. 10BASE-TX, for example, is specified in IEEE 802.3 and can transfer data at a nominal rate of 10 Mbit/sec. Data is transferred over an unshielded twisted-pair (UPT) cable with a specified length.

An Ethernet receiver commonly uses a slicer to map a received signal into one of some predetermined values. The slicer compares the received signal with one or more fixed threshold values in order to determine the mapped output.

However, as the UPT cable length is expanded, aged or disposed in a noisy environment, the received signal at the receiver side may probably be decayed or have lower signal-to-noise ratio (SNR). The fixed threshold values in the receiver's slicer cannot follow the signal decay, and the receiver's performance therefore becomes deteriorated.

For the reason that conventional Ethernet receiver could not effectively receive data in a noisy environment, a need has arisen to propose an adaptive receiver that is capable of automatically detecting and adjusting parameters of the receiver.

SUMMARY OF THE INVENTION

In view of the foregoing, it is an object of the embodiment of the present invention to provide a system and method of adaptively regulating a slicer for a communication receiver such that the receiver can effectively and correctly recover data.

According to one embodiment, an Ethernet receiver includes a slicer, a medium dependent interface (MDI) sublayer and a threshold regulator. The slicer performs slicing on a received signal according to at least one threshold value to generate a slicer output. The MDI sublayer receives the slicer output and obtains a data symbol. The threshold regulator is operatively coupled to the MDI sublayer and adaptively regulates the at least one threshold value according to the slicer output. Specifically, the threshold regulator includes a zero-crossing accumulator and a threshold decision unit. The zero-crossing accumulator receives the slicer output from the MDI sublayer and determines an accumulated number representing a zero-crossing length of the slicer output. The threshold decision unit regulates the at least one threshold value of the slicer according to the accumulated number.

DETAILED DESCRIPTION OF THE INVENTION

Figure 1:
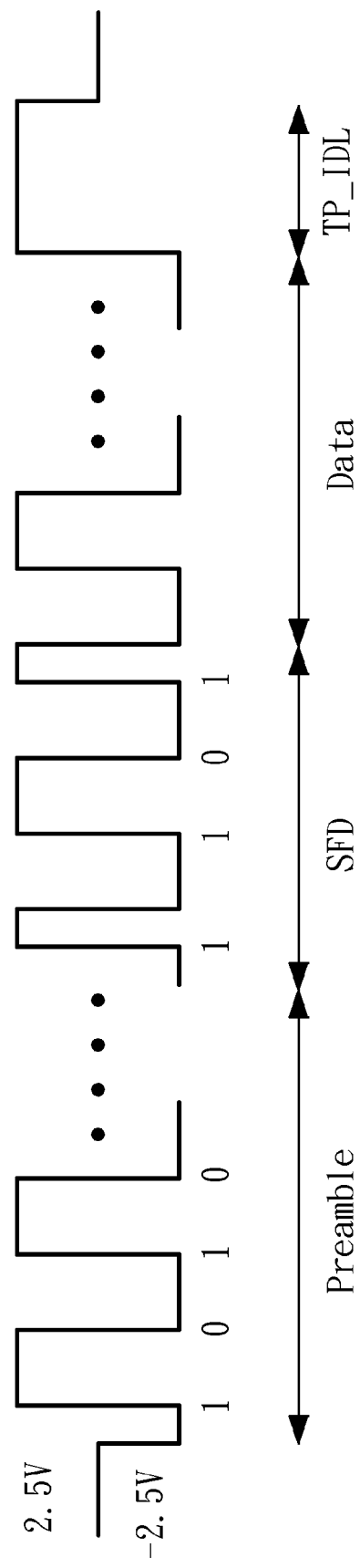
FIG. 1 shows a representative waveform of a frame structure of 10BASE-T.

FIG. 1 shows a representative waveform of a frame structure of Ethernet, over twisted pair running at 10 Mbit/sec (or 10BASE-T). Each frame includes four parts: a preamble, a start of frame delimiter (SFD), data and an end of frame TP_IDL. The preamble commonly includes a pattern alternated with "0" and "1," which are used for the purpose of synchronizing a receiver. At the end of the preamble is the SFD, which includes a specific pattern (e.g., 1101 as shown in FIG. 1.) that is used to determine the beginning of the data. Following the data is the ending of frame TP_IDL (e.g., a predetermined period of high level before returning back to zero level) that is used to indicate the ending of the frame.

As shown in FIG. 1, the waveform of 10BASE-T adopts Manchester coding, in which each data bit has at least one transition. For example, a bit "1" is represented by low-to-high transition, and a bit "0" is represented by high-to-low transition. As the high level and the low level are 2.5 volt and −2.5 volt respectively, the Manchester coding has no DC component. Moreover, as each data bit occupies the same time, a clock signal can be recovered by the receiver.

Figure 2:
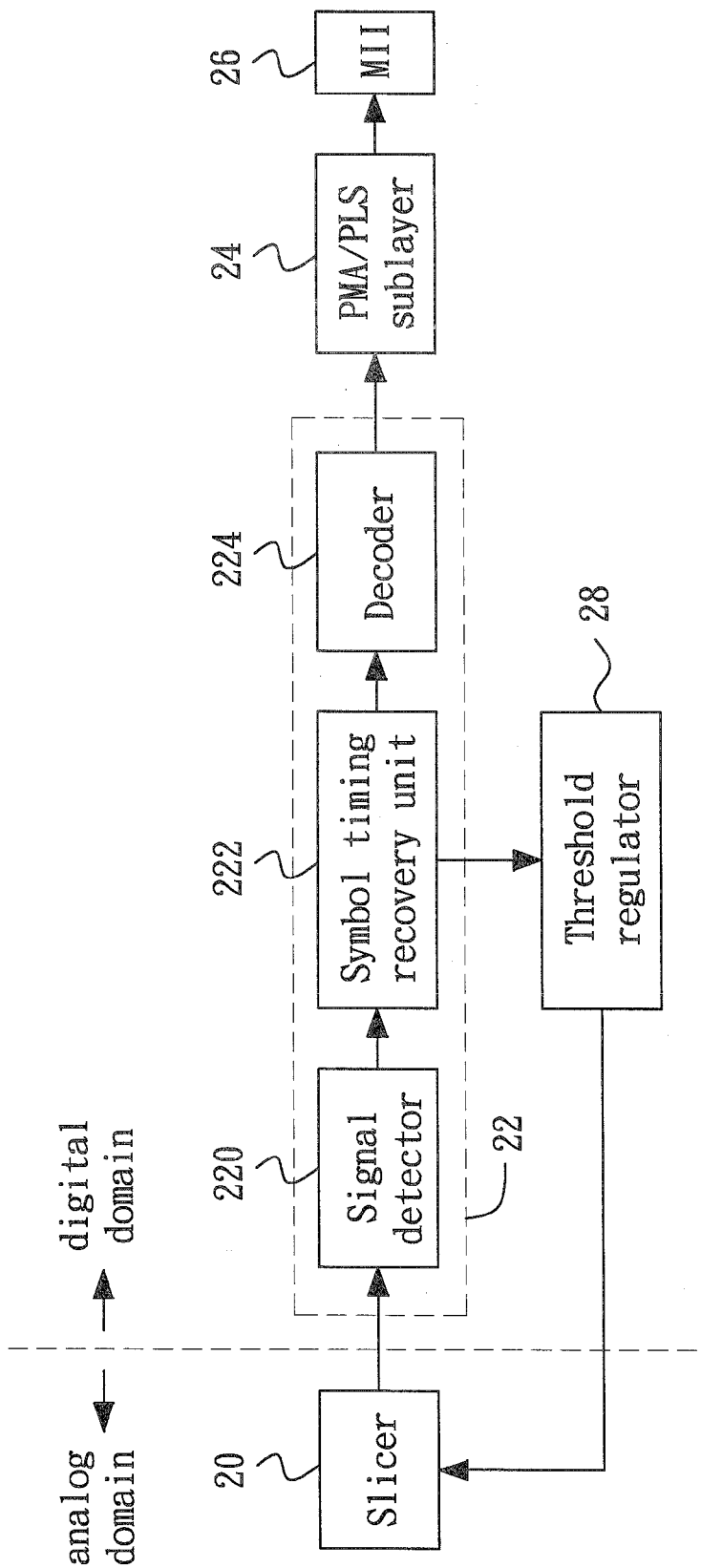
FIG. 2 shows a block diagram of a communication receiver according to one embodiment of the present invention.

FIG. 2 shows a block diagram of a communication receiver according to one embodiment of the present invention. Although Ethernet over twisted pair running at 10 Mbit/sec (or 10BASE-T) is adopted in the embodiment, it is appreciated by those skilled in the pertinent art that the present embodiment may be adapted to other communication receiver that adopts Manchester coding or the like in which each data bit has at least one transition.

In the embodiment, the receiver includes a slicer 20, a medium dependent interface (MDI) 22, a physical medium attachment/physical layer signaling (PMA/PLS) sublayer 24, a medium independent interface (MII) 26 and a threshold regulator 28. The MDI 22 includes a signal detector 220, a symbol timing recovery (STR) unit 222 and a decoder (e.g., Manchester decoder) 224. In the embodiment, the slicer 20 operates in an analog domain, and the other blocks (i.e., blocks 22 to 28) operate in a digital domain.

Figure 3A:
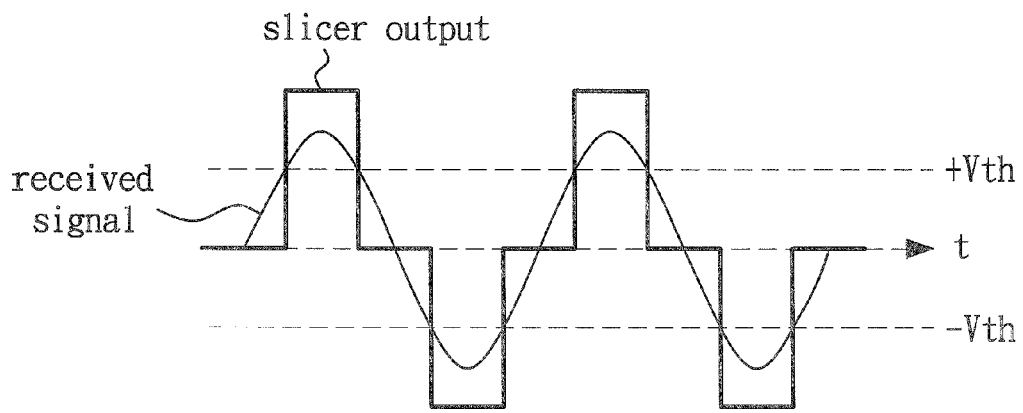
FIG. 3A shows an exemplary received signal and a slicer output according to original threshold values.

Specifically, the slicer 20 receives and performs slicing on a received signal according to at least one threshold value to generate a multi-level (e.g., tri-level) slicer output. FIG. 3A shows an exemplary received signal and a slicer output according to original threshold values. The slicer 20 generates a high-level slicer output ("1") when the received signal becomes greater than a positive threshold value +Vth, and the slicer 20 generates a low-level slicer output ("−1") when the received signal becomes less than a negative threshold value −Vth. Between the high-level slicer output and the adjacent low-level slicer output is a zero-crossing-level slicer output ("0"). In other words, the slicer 20 generates a zero-crossinglevel ("0") when the received signal is less than the positive threshold value +Vth but greater than the negative threshold value −Vth.

Subsequently, the slicer output is fed to the MDI sublayer 20, therefore obtaining data symbol, for example, at a rate of 10 Mbit/sec. Specifically, the signal detector 220 detects the presence of the slicer output and accordingly activates the PMA/PLS sublayer 24. The symbol timing recovery (STR) unit 222 determines an optimal symbol sampling point according to the zero-crossing-level. The decoder 224 such as Manchester decoder performs decoding on the slicer output in order to obtain the data. symbol, for example, at the rate of 10 Mbit/sec. In the embodiment, the signal detector 220 is operatively coupled to an output of the slicer 20, the STR unit 222 is operatively coupled to an output of the signal detector 220, and the decoder 224 is operatively coupled to an output of the STR unit 222.

Afterwards, an output of the MDI sublayer 20 is fed to the PMA/PLS sublayer 24, whose output is further fed to the MII 26, therefore resulting in an MII signal, for example, at a rate of 2.5 Mbit/sec. The MII signal is then processed by a media access control (MAC) layer (not shown). In this disclosure, the terms "MDI" "STR," "PMA," "PLS," and "MII" may be further referred to Ethernet standard such as IEEE 802.3 specification, the disclosure of which is hereby incorporated, by reference.

Figure 3B:
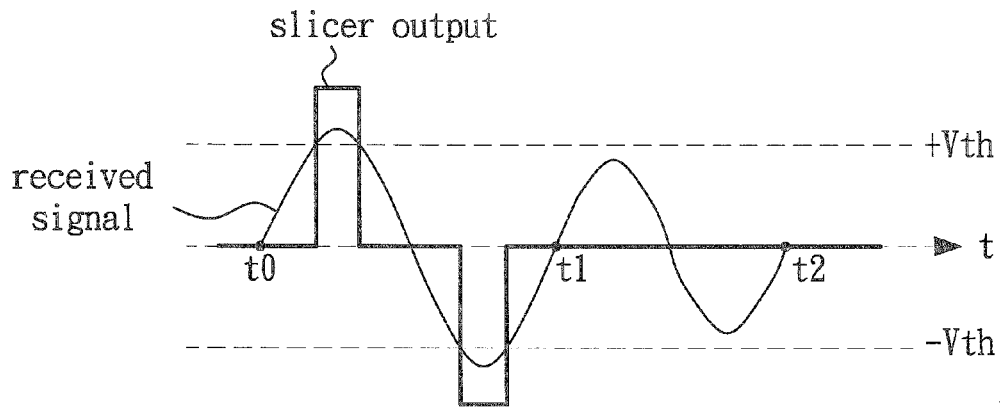
FIG. 3B shows an exemplary decayed received signal and an erroneous slicer output according to original threshold values.

As cable length and/or noise interference become large, the received. signal suffers serious signal decay, which makes the symbol timing recovery difficult or even erroneous. FIG. 3B shows an exemplary decayed received signal and an erroneous slicer output according to original threshold values. It is observed that, between time t0-t1, the zero-cross length becomes larger than that in FIG. 3A, and, between time t1-t2, the zero-crossing occupies the whole period of the (decayed) received signal. Generally speaking, the more decayed is the received signal, the larger is its zero-crossing.

According to one aspect of the present embodiment, the threshold regulator 28 is utilized to adaptively regulate or adjust the threshold value (e.g., +Vth and −Vth) of the slicer 20. Although the embodiment uses two threshold. values +Vth and −Vth, the number of the threshold value may be less than or greater than two. Moreover, the absolute value of the positive threshold value +Vth may unnecessarily be the same as the absolute value of the negative threshold value −Vth.

Figure 4:
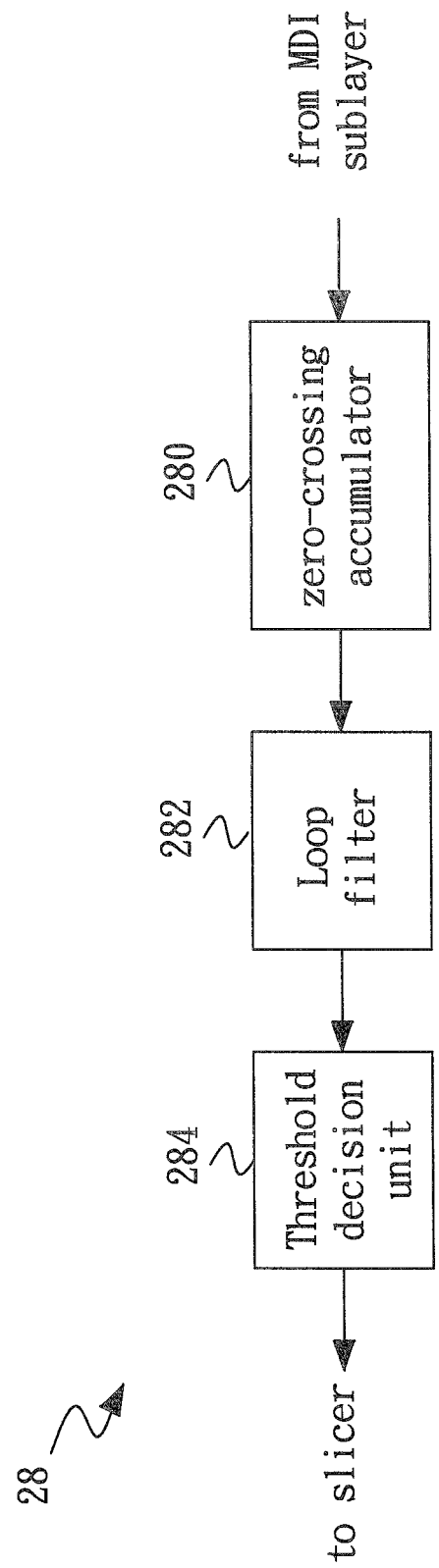
FIG. 4 shows a detailed block diagram of the threshold regulator of FIG. 2 according to one embodiment of the present embodiment.

FIG. 4 shows a detailed block diagram of the threshold regulator 28 according to one embodiment of the present embodiment. In the embodiment, a zero-crossing accumulator 280 receives the slicer output or its derived signal from, for example, the STR unit 222 of the MDI sublayer 22. The zero-crossing accumulator 280 determines the zero-crossing length by accumulating the number of clocked samples of the zero-crossing. The frequency for clocking the zero-crossing is higher than the frequency of the received signal (or the slicer output).

The accumulated number (or its equivalent zero-crossing length) from the zero-crossing accumulator 280 is then fed to a loop filter 282, such as a first-order low-pass filter, which is utilized to smooth out the accumulated numbers between the current frame and at least one preceding frame. As a result, an abrupt change in the accumulated number may be prevented, therefore resulting in a stable performance. The filtered result from the loop filter 282 is fed to a threshold decision unit 284 that regulates the threshold value(s) of the slicer 20 according to the filtered accumulated. number (or its equivalent filtered zero-crossing length). In the embodiment, the threshold decision unit 284 regulates the threshold value(s) for a subsequent frame according to the filtered accumulated number of the current frame.

Figure 3C:
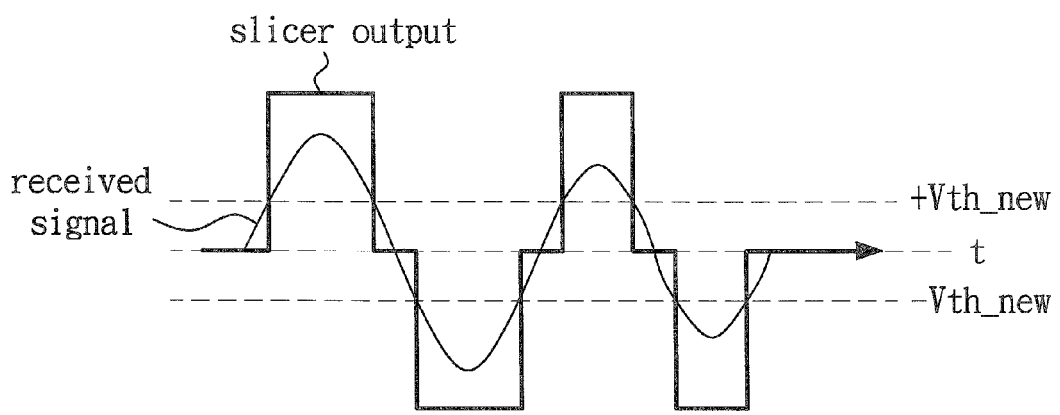
FIG. 3C shows an exemplary decayed received signal and a correct slicer output according to newly regulated threshold values.

FIG. 3C shows an exemplary decayed received signal and a correct slicer output according to newly regulated threshold values +Vth_new and −Vth_new. In the example, as the received signal is decayed and its zero-crossing becomes longer, the new threshold values +Vth_new and −Vth_new are thus obtained by decreasing the absolute value of the original threshold values +Vth and −Vth respectively (FIG. 3B). Generally speaking, the absolute value of the threshold value is decreased when the zero-crossing becomes longer (or the accumulated number becomes larger). On the other hand, the absolute value of the threshold value is increased when the zero-crossing becomes shorter (or the accumulated number becomes smaller).

Although specific embodiments have been illustrated and described, it will be appreciated by those skilled in the art that various modifications may be made without departing from the scope of the present invention, which is intended to be limited solely by the appended claims.

What is claimed is:

1. A system of regulating a slicer for a communication receiver, the system comprising:
   a zero-crossing accumulator configured to receive a slicer output from the slicer and accordingly determine a zero-crossing length of the slicer output; and
   a threshold decision unit configured to regulate at least one threshold value of the slicer according to the zero-crossing length;
   wherein an absolute value of the threshold value is decreased by the threshold decision unit when the zero-crossing length becomes larger; and the absolute value of the threshold value is increased by the threshold decision unit when the zero-crossing length becomes smaller.

2. The system of claim 1, wherein the zero-crossing accumulator determines the zero-crossing length by accumulating a plurality of clocked samples of the zero-crossing, thereby resulting in an accumulated number.

3. The system of claim 1, wherein the threshold decision unit regulates the at least one threshold value for a subsequent frame according to the zero-crossing length of a current frame.

4. The system of claim 1, further comprising a loop filter configured to smooth out a plurality of the determined zero-crossing lengths between or among a current frame and at least one preceding frame, wherein the filtered zero-crossing length is then fed to the threshold decision unit.

5. The system of claim 1, wherein the slicer output adopts a coding, in which each data bit has at least one transition.

6. The system of claim 5, wherein the coding is Manchester coding.

7. A method of regulating a slicer for a communication receiver, the method comprising:
   receiving a slicer output from the slicer;
   determining a zero-crossing length of the slicer output;
   regulating at least one threshold value of the slicer according to the zero-crossing length;
   decreasing an absolute value of the threshold value when the zero-crossing length becomes larger; and
   increasing the absolute value of the threshold value when the zero-crossing length becomes smaller.

8. The method of claim 7, wherein the step of determining the zero-crossing length is performed by accumulating a plurality of clocked samples of the zero-crossing, thereby resulting in an accumulated number.

9. The method of claim 7, wherein the step of regulating the at least one threshold value is performed for a subsequent frame according to the zero-crossing length of a current frame.

10. The method of claim 7, before the step of regulating the at least one threshold value, further comprising a step of smoothing out a plurality of the determined zero-crossing lengths between or among a current frame and at least one preceding frame.

11. The method of claim 7, wherein the slicer output adopts a coding in which each data bit has at least one transition.

12. The method of claim 11, wherein the coding is Manchester coding.

* * * * *